D. E. Somes,
Cooling Tank.
No. 100,682.        Patented Mar. 8, 1870.
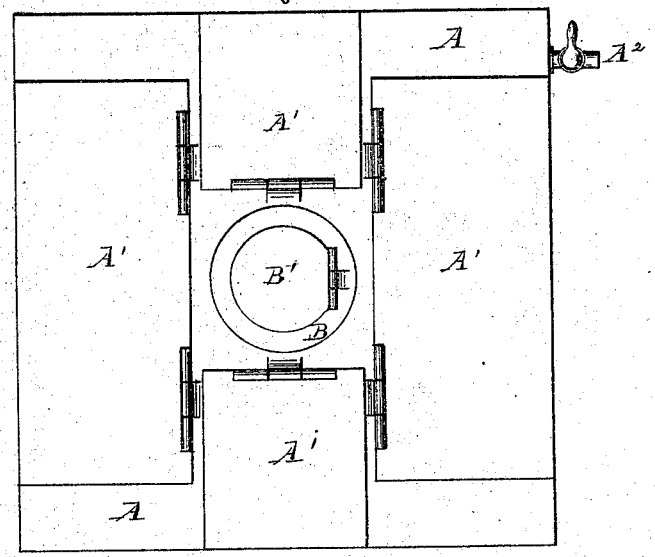
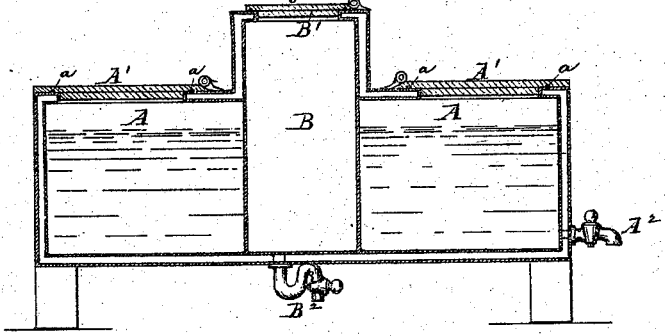

UNITED STATES PATENT OFFICE.

DANIEL E. SOMES, OF WASHINGTON, DISTRICT OF COLUMBIA.

IMPROVED COOLING AND PRESERVING TANK.

Specification forming part of Letters Patent No. 100,682, dated March 8, 1870.

*To all whom it may concern:*

Be it known that I, DANIEL E. SOMES, of Washington, in the District of Columbia, have invented a new and useful Cooling and Preserving Tank; and I do hereby declare that the following is a full, clear, and exact description thereof, reference being had to the annexed drawings, making part of this specification, in which—

Figure 1 is a plan or top view of my improved cooling and preserving tank. Fig. 2 is a central vertical section thereof.

The same letters are used in both figures to designate identical parts.

This invention relates to a tank for cooling and preserving perishable articles; and my improvement consists in combining with such a tank or box of ordinary construction an ice-receptacle set in the same, but having no communication with it, as will be more fully set forth in the following specification and claim.

To enable those skilled in the art to make and use my invention, I will proceed to describe its construction and operation.

In the annexed drawings, A represents a tank or box, built in any convenient form and of a size to suit the conditions under which it is to be used. Its walls are to be made double or multiple, as clearly shown in Fig. 2, and the spaces between them packed or filled with good non-conducting material to prevent the radiation of the heat through them. This box may be supported upon legs, to raise it a short distance from the ground. In its upper wall a suitable number of openings are made through which to insert any articles or bodies into the same. Around these openings grooves may be made in the upper surface of the tank in which to secure rubber tubing $a$, for the purpose of forming, as nearly as practicable, air-tight joints between the tank and the doors A', which close the openings, and may be hinged to the tank, as shown.

B represents the ice-receptacle, set centrally by preference in the surrounding tank or box A, and either built in one therewith or placed loosely in it, in which latter case it must be provided with a bottom, and a suitable flange or collar formed upon the bottom of the tank to receive it and hold it in proper place. This receptacle may protrude above the top of the ank, or it may be even with it, as circumstances and the taste of the manufacturer may dictate. In the former case the protruding part should have double walls, as shown in Fig. 2. The portion within the tank is always made with a single wall. A hinged head or cover, B', closes the opening in its top, through which the ice or other cooling substance is passed into it. A trap, $B^2$, is arranged to draw off the accumulation of water in said ice-receptacle.

In most instances it will be found the most economical to partly fill the tank with brine or other liquid, in which vessels containing the articles to be cooled or preserved are then placed. For this reason the tank should generally be built water-tight, and also provided with a cock or gate, $A^2$, through which the liquid can be discharged when it becomes necessary or desirable to do so.

The ice-receptacle may be placed at either side of the tank, instead of in the center, as I have shown and described it.

What I claim as my invention, and desire to secure by Letters Patent, is—

The combination of the tank A, built with non-conducting chambers, and the cooling-chamber B, substantially as and for the purpose specified.

D. E. SOMES.

Witnesses:
 B. EDW. J. EILS,
 F. C. SOMES.